United States Patent [19]

Calamará

[11] Patent Number: 4,971,555
[45] Date of Patent: Nov. 20, 1990

[54] HEAT EXCHANGE BELT CONVEYING APPARATUS, IN PARTICULAR FOR THIN SHEET PRODUCTS AND THE LIKE

[75] Inventor: Giovanni Calamará, Messina, Italy

[73] Assignee: Steel Belt System, S.R.L., Milan, Italy

[21] Appl. No.: 381,761

[22] Filed: Jul. 18, 1989

[30] Foreign Application Priority Data

Jul. 22, 1988 [IT] Italy ............................ 21465 A/88

[51] Int. Cl.$^5$ ............................................. B29C 35/00
[52] U.S. Cl. ......................................... 432/59; 432/77
[58] Field of Search ................. 432/77, 59, 8; 34/110, 34/113, 118; 198/952; 264/211.12, 211.13, 211.17, 211.18; 425/377, 378.1; 100/93 RP

[56] References Cited

U.S. PATENT DOCUMENTS

| 838,615 | 12/1906 | Goldman | 100/93 RP |
| 2,442,443 | 12/1944 | Swallow | 100/93 RP X |
| 2,812,542 | 11/1957 | Bleher | 100/93 RP X |
| 3,850,093 | 11/1974 | Gersbeck | 100/93 RP |
| 4,631,016 | 12/1986 | Hay, II | 425/377 X |
| 4,696,779 | 9/1987 | Wideman | 425/377 X |

FOREIGN PATENT DOCUMENTS 449079 9/1927 Fed. Rep. of Germany ... 100/93 RP

Primary Examiner—Albert J. Makay
Assistant Examiner—Christopher B. Kilner
Attorney, Agent, or Firm—Laff, Whitesel, Conte & Saret

[57] ABSTRACT

The apparatus comprises a steel belt (5) extending according to an endless strap around two guide rollers (3, 4) driven in rotation according to horizontal axes. The upper part of the belt (5) defines a first going stretch (5a) onto which the product (6) in progress of working is laid, said product being transported due to the movement communicated to the belt as a result of the rotation of said guide rollers. Water is sprayed against the underneath surface of the first belt stretch for cooling the product through a heat exchange with the belt itself. The apparatus further comprises a heat exchange roller (14) rotatably supported according to the horizontal axis and arranged so that it comes in contact with the product (6) located on the first belt stretch (5a). Water circulation takes place within the heat exchange roller (14) and an additional cooling action is therefore accomplished on said product (6).

7 Claims, 1 Drawing Sheet

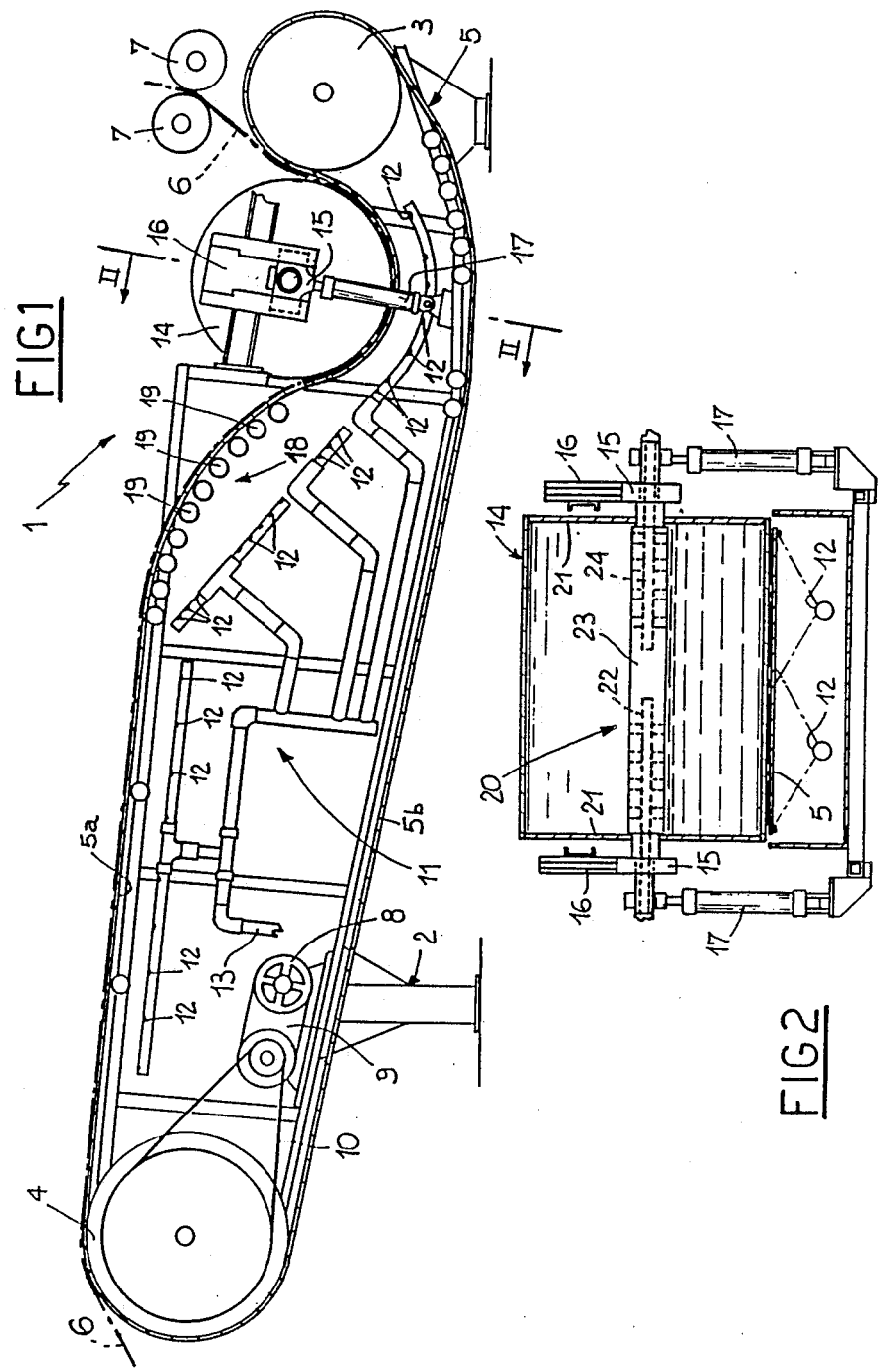

HEAT EXCHANGE BELT CONVEYING APPARATUS, IN PARTICULAR FOR THIN SHEET PRODUCTS AND THE LIKE

BACKGROUND OF THE INVENTION

1. Field of the Invention

The present invention relates to a heat exchange belt conveying apparatus, in particular for thin sheet products and the like, of the type comprising a support structure; one guide roller rotatably mounted according to a horizontal axis on the support structure; a second guide roller rotatably mounted according to a horizontal axis on the support stucture in a position spaced apart from the first guide roller; a continuous belt made of a material having a high heat conductivity and extending so as to form an endless strap around the guide rollers thereby creating a first going stretch extending over the guide rollers and designed to transport a sheet-like product which is laid thereon adjacent the first guide roller, as well as a return stretch extending underneath th first going stretch and said rollers; a motor operating on at least one of the guide rollers to drive them in rotation so that the product is carried towards the second guide roller due to the displacement of said belt; and first thermoregulation means acting on the lower surface of the first belt stretch in order to carry out, through the latter, a heat exchange with the product carried by the belt.

More particularly, the apparatus in question can be, for example, installed at the outlet of an extruder for carrying out the cooling of a proudce extruded in the form of a thin sheet. The apparatus of the invention can however be used as a heating means as well, for example for carrying out the drying or polishing of particular products.

For the sake of clarity, in the following, particular reference will be made to the use of the apparatus as a cooler, although the possibilities of use of the same are not limited thereby.

2. Prior Art

It is known that there are belt conveying apparatuses which not only carry out the transport of the product laid thereon, but are also capable of performing an efficient heat exchange action with the product itself.

In their simplest embodiments, these apparatuses are essentially comprised of two guide rollers around which a steel belt extends so as to form an endless strap which is driven by effect of the rotation communicated to the guide rollers upon command of a motor. The belt defines a going stretch extending above the guide rollers and transporting the product in progress of working which has been laid thereon, and a return stretch extending underneath the going stretch.

Acting in the region of the going stretch is thermoregulation means designed to cause the withdrawal or delivery of heat respectively from and to the product carried thereon. If the aspparatus is used as a cooler said thermoregulation means may for example consist of a number of nozzles sprayig cold water onto the lower surface of the going stretch of the belt, so as to cause the cooling of the product by conduction through the belt itself. In order to achieve a more efficient cooling of the product it is also possible to blow cold air thereon so that a cooling action by convention can be added to the above cooling action.

One of the most important problems connected with the use of apparatuses of this type resides in the length of the going stretch of the belt which must be sufficient to achieve the desired heat exchange with the product in progress of working. As said length increases in proportion to the aimed productivity and to the amount of heat to be exchanged, the apparatus must necessarily be very bulky and therefore its installation becomes problematical.

In order to eliminate this drawback as far as possible, the apparatuses of the known art have been provided with a second steel belt wound around respective rollers and having a portion of its length extending above the going stretch of the first belt; said second belt moves at the same speed as the first belt.

The product being worked is therefore enclosed between two belts and water is delivered to each of them in order to achieve a cooling by conduction on both surfaces of said product.

This solution gives rise to a more efficient heat exchange with the product being worked and therefore allows the length of the going stretch of the belt to be reduced with respect to the previously described solutions, the required productivity and the amount of heat to be exchanged being equal.

But, on the other hand, apparatuses with two belts have a very complicated structure and, as a result, high production costs.

In addition, it is always rather difficult to achieve an optimum contact, and therefore an optimum heat exchange, between the upper belt and the product, because said contact is exclusively the result of the catenary which tends to be formed along the lower portion of the belt.

SUMMARY OF THE INVENTION

The main object of the present invention is to obviate the drawbacks of the known art by providing an apparatus in which an optimum heat exchange with the product being worked is ensured, so as to allow the belt length to be considerably reduced thus bringing about a reduction of the apparatus bulkiness.

The foregoing and further objects which will become more apparent in the following are substantially attained by a heat exchange belt conveying apparatus, in particular for thin sheet products and the like comprising at least a heat exchange roller rotatably supported according to a horizontal axis in relation to said support structure and located along the path of the first belt stretch to come in contact with the product carried thereon, and an auxiliary thermoregulation means associated with the heat exchange roller to carry out a heat exchange between said roller and the product carried by the belt.

BRIEF DESCRIPTION OF THE DRAWINGS

Further features and advantages will best be understood from the detailed description of a preferred embodiment of the invention given hereinafter by way of non-limiting example with reference to the accompanying drawings, in which:

FIG. 1 is a schematic side view of the apparatus in question;

FIG. 2 is an enlarged section of a heat exchange roller associated with said apparatus.

DESCRIPTION OF THE PREFERRED EMBODIMENT

Referring to the drawings and particularly to FIG. 1, a heat exchange belt conveying apparatus, in particular for thin sheet products and the like, in accordance with the present invention, has been generally identified by reference numberal 1.

Apparatus 1 comprises a support structure 2 which is only partly shown and on which first and second guide rollers identified by 3 and 4 respectively, have been rotatably mounted according to horizontal axes and at suitably spaced apart positions.

Extending around said guide rollers 3 and 4 according to an endless strap is a belt 5 made of a material having a high heat conductivity, preferably steel and defined along the extension of the belt 5 is a first going stretch 5a extending above the guide rolers 3 and 4, and a second return stretch extending below the going stretch 5a.

The going stretch 5a is arranged so as to carry out the transport of a product 6 having a substantially sheet-like structure, which is continuously fed for example by two feed cylinders 7, not shown, disposed at the outlet of an extruder.

In greater detail, the product 6 conveyed onto the belt 5 close to the first guide roller 3, is transported towards the second guide roller 4 by effect of the movements communicated to the belt 5 as a result of the rotation of said guide rollers driven by a motor 8 acting on one of them. In the example shown in FIG. 1 the motor 8 is connected to the second guide roller 4 through the interposition of a speed variator 9 connected to the roller itself via a driving belt 10 or similar means.

In a manner known per se, first thermoregulation means generally referenced at 11 acts under the going stretch 5a of belt 5. They are arranged so as to perform a heat exchange through said belt 5 with the product carried thereon. In the example shown the thermoregulation means 11 substantially comprises a number of nozzles 12 which, as shown in FIG. 1, are divided into several sections communicating with a primary delivery duct 13. Nozzles 12 are distributed so as to deliver water uniformly over the whole lower surface of the first belt stretch 5a , for the purpose of causing a withdrawal of heat from the product 6 through belt 5, by conduction.

In an original manner, the apparatus 1 further comprises at least a heat exchange roller 14 rotatably supported according to a horizontal axis relative to the support structure 2 and disposed along the path of the first going stretch 5a so that it comes in contact with the product 6 carried by said belt 5. In greater detail, it is preferably provided that the exchange roller 14 should be rotatably mounted on two supports 15 slidably engaged along guides 16 integral with the support structure 2. Supports 15 are movable, in a substantially vertical direction, along guides 16 acted upon by fluid-operated cylinders 17 by which it is possible to achieve the raising of roller 14 from belt 5.

In a preferred embodiment the heat exchange roller 14 is disposed adjacent the first guide roller 3, its axis being close to the lying plane common to the axes of guide rollers 3 and 4. In addition, the ratio between the diameters of the heat exchange roller 14 and first guide roller 3 has a value preferably ranging between 0.8 and 2.5.

Due to these particular features the heat exchange roller 14 has a great arc in contact with the product 6 although at the same time the presence of said heat exchange roller does not involve an important increase in the bulkiness of the whole apparatus.

Also provided is guide means 18 preferably consisting of idler rollers 19 acting on the first belt stretch 5a downstream of the heat exchange roller 14 in order to guide the belt 5 according to an ascending path whose slant decreases as the heat exchange roller moves away therefrom. Thanks to the arrangement of the guide means 18, it is possible to increase the contact arc of the heat exchange roller 14 on the product 6 and to cause the going stretch 5a to be spaced apart from the return stretch 5b so that the first thermoregulation means 11 can be housed between said going and return stretches.

Associated with the heat exchange roller 14 is auxiliary thermoregulation means 20 shown in greater detail in FIG. 2, substantially acting in such a manner that a heat exchange can take place with the product 6 carried by belt 5, through the roller itself.

To this end, in the example shown, for the accomplishment of said auxiliary thermoregulation means 20 the heat exchange roller 14 must have a cylindrical hollow configuration tightly sealed at the opposite ends thereof by flanges 21. When the heat exchange roller has the above configuration a cooling liquid such as water is sent thereinto through a delivery duct system 22 preferably formed in a shaft 23 connecting the roller itself to the supports 15. Also formed in the shaft 23 is an outlet duct system 24 through which water is exhausted from the heat exchange roller 14.

The outlet duct system 24 is arranged in such a manner that the water running within the heat exchange roller 14 fills at least the lower half thereof, that is the area in which the roller itself comes in contact with the product 6. Said water is therefore capable of efficiently withdrawing heat from the product 6 through the heat exchange roller 14.

Operation of the above described apparatus is very simple.

The product 6 coming out of the extruder is sent via the feed rollers 7 onto the going stretch 5a adjacent the first guide roller 3. Due to thye movements communicated to the belt 5 as previously described, the product 6 is immediately conveyed underneath the heat exchange roller 14 which, being pulled along by friction by the product itself or being driven in rotation by suitable actuators, is rotated at a peripheral speed substantially indentical to the belt displacement speed.

When the product 6 crosses the area in which it is in contact with the heat exchange roller 14 it is simultaneously submitted, by heat conduction through the roller itself, to the cooling action of the auxiliary thermoregulation means 20 and, by heat conduction through the belt 5, to the cooling action of the first thermoregulation means 11.

Under this situation the product 6 is subjected to transfer most of the heat it had on its coming out of the extruder.

This heat exchange step is greatly promoted due to the fact that, as a result of the deformation that belt 5 undergoes close to the heat exchange roller 14, the product 6 tends to be slightly compressed between the roller and belt surfaces.

As the belt 54 advances the product 6 gradually leaves the heat exchange roller 14 and moves towards the second guide roller 4 so that it undergoes the cooling action exerted by the water sprayed underneath the going stretch 5a through nozzles 12.

Once it has reached the second guide roller 4, the product 6, which has become cool, can be either moved away from the apparatus 1 by means of conveyor belts or cut and conveyed onto suitable receiving means in a manner known per se and conventional.

The present invenstion attains the intended purposes.

The apparatus in question is in fact capable of ensuring an optimum heat exchange with the product being worked, due above all to the presence of the heat exchange roller 14. Therefore, as compared with the apparatuses of the known art, it is possible to greatly reduce the length of the belt 5 and, as a result, the bulkiness of the whole apparatus, without resorting to solutions which make the structure of the apparatus itself more complicated.

Obviously many modifications and variations may be made to the invention as conceived, all falling within the scope of the inventive idea characterizing it.

What is claimed is:

1. A heat exchange belt conveying apparatus, in particular for thin sheet products and the like, comprising:
   a support structure,
   a first guide roller rotatably mounted according to a horizontal axis on said support structure;
   a second guide roller rotatably mounted according to a horizontal axis on said support structure in a position spaced apart from said first guide roller;
   a continuous belt made of a material having a high heat conductivity and forming an endless strap around said guide rollers, whereby a first going stretch extending over said guide rollers and designed to transport a sheet-like product which is laid thereon adjacent to said first guide roller, and a return stretch extending underneath said first going stretch and said rollers are created;
   a motor operating on at least one of said guide rollers to drive them in rotation so that said product is carried towards said second guide roller due to a displacement of said belt;
   first thermoregulation means acting on the lower surface of said first going stretch, for exchanging heat with said product carried by said belt;
   one or more heat exchange rollers rotatably supported according to a horizontal axis in relation to said support structure and located along the path of said first going stretch to come in contact with said product carried thereon;
   auxiliary thermoregulation means associated with said roller to carry out a heat exchange between said roller and said product carried by said belt; and
   guide means acting on said first going stretch of said belt downstream of said exchange roller to guide said belt according to an ascending path moving away from said roller itself.

2. A heat exchange belt conveying apparatus, in particular for thin sheet products and the like, comprising:
   a support structure,
   a first guide roller rotatably mounted according to a horizontal axis on said support structure;
   a second guide roller rotatably mounted according to a horizontal axis on said support structure in a position spaced apart from said first guide roller;
   a continuous belt made of a material having a high heat conductivity and forming an endless strsap around said guide rollers, whereby a first going stretch extending over said guide rollers and designed to transport a sheet-like product which is laid thereon adjacent to said first guide roller, and a return stretch extending underneath said first going stretch and said rollers are created;
   a motor operating on at least one of said guide rollers to drive them in rotation so that said product is carried towards said second guide roller due to a displacement of said belt;
   first thermoregulation means acting on the lower surface of said first going stretch, for exchanging heat with said product carried by said belt;
   one or more heat exchange rollers rotatably supported according to a horizontal axis in relation to said support structure and located along the path of said first going stretch to come in contact with said product carried thereon, said heat exchange rollers being mounted on supports which upon command of fluid operated cylinders can be positioned along substantially upright guides fastened to said support structure; and
   auxiliary thermoregulation means associated with said heat exchange roller to carry out a heat exchange between said roller and said product carried by said belt.

3. The apparatus as claimed in claim 1 or 2, wherein said heat exchange roller is disposed adjacent the first guide roller.

4. The apparatus as claimed in claim 1, wherein the diameter ratio between the heat exchange roller and the first guide roller ranges between 0.8 and 2.5.

5. The apparatus as claimed in claim 1 or 2, wherein the axis of the heat exchange roller is disposed close to the lying plane common to the axes of the guide rollers.

6. The apparatus as claimed in claim 1 or 2, wherein said auxiliary thermoregulation means comprises a delivery duct system opening into the heat exchange roller to feed cooling liquid to the latter and an outlet duct system arranged to exhaust the cooling liquid from the roller, said roller exhibiting a cylindrical hollow shape tightly sealed at the opposite ends thereof.

7. The apparatus as claimed in claim 6, wherein the delivery and outlet ducts are formed in a shaft rotatably supporting the heat exchange roller with respect to the support structure.

* * * * *